UNITED STATES PATENT OFFICE.

LEONARD PAGET, OF NEW YORK, N. Y., ASSIGNOR OF ONE-HALF TO CHARLES COSTER, OF NEW YORK, N. Y.

PROCESS OF MAKING STORAGE-BATTERY ELECTRODES.

SPECIFICATION forming part of Letters Patent No. 686,679, dated November 12, 1901.

Application filed September 8, 1899. Serial No. 729,835. (No specimens.)

*To all whom it may concern:*

Be it known that I, LEONARD PAGET, a citizen of the United States, residing at New York, county of New York, and State of New York, have invented certain new and useful Improvements in Processes of Making Storage-Battery Electrodes, fully described and represented in the following specification and the accompanying drawings, forming a part of the same.

This invention relates to the art of making plates or electrodes for storage batteries, the object being to produce from oxid of lead an electrode or a plate or other element adapted to form an electrode that shall be very light, strong, and hard, so as to stand usage, although no conducting or other support for the active material be used, and which may be either peroxidized or reduced without disintegrating, so as to be suitable for use as either a positive or negative electrode, according to its formation by the electric current.

In accordance with the present invention I form my plate by mixing together oxid of lead, litharge being convenient and efficient for this purpose, although any other oxids of lead may be used, sulfate of lead, and zinc, the zinc being in a finely-divided form and preferably of the character and fineness of the material known as "zinc-dust." While, as above stated, any other oxids of lead may be used in place of litharge, I have found that the lower oxids or mixtures of the lower and higher oxids are more efficient than the higher oxids alone. The proportions in which these materials are mixed may be varied somewhat; but I have secured the best results with about four parts, by weight, of litharge, one part, by weight, of sulfate of lead, and of zinc-dust one-fifth to one-third, by weight, of the combined litharge and sulfate of lead. The sulfate of lead should preferably not exceed the amount stated, but may be decreased even to one-half part, by weight, of the litharge, and I have found in practice that the zinc-dust should not exceed the highest proportion stated. These materials are mixed dry and then pressed under a moderate pressure—as, for instance, by hand in an ordinary screw-press or copying-press—and while in the press are moistened with water by pressing a wet pad onto the plate or sprinkling the plate in any way so as to moisten it evenly. The result is that great heat is developed and the plate becomes a very hard stone-like mass, which is a mixture of reduced lead, oxid of lead reduced and then reoxidized, and sulfate of zinc. The plate might, of course, be moistened before pressing without affecting the chemical operation, but the materials set so quickly that the desired density cannot well be secured thus, as it is difficult to work the materials at all after moistening. The plate thus made is then prepared by making it the cathode of an electrolytic bath consisting of a solution of sulfate of magnesium, potassium, or ammonium, or the sulfate of an alkali metal, this solution being used and the plate made the cathode to prevent the too rapid solution of the zinc in forming the plate, which would tend to disintegrate the plate. The sulfate of zinc is dissolved out during this process, thus leaving the plate strong and hard, but of such porosity as to admirably serve the purposes of a storage-battery electrode. It is possible to dissolve out the sulfate of zinc with water or with the plate constituting the anode of the electrolytic bath above described, but either will leave the plate weaker.

The plate or electrode prepared as above described may have a conducting-lug soldered on at any desired point or otherwise secured on or in the plate, and when formed electrically by the ordinary process may be used in the ordinary sulfuric acid or other solution, as either the positive or negative electrode of the battery, according to its formation by the electric current.

It is found in practice that my invention provides a very light strong durable storage-battery element suitable for use either as a positive or negative electrode, and by which I may avoid the use of a conducting-support for the active material with its objectionable features of great weight and liability to poor contact between the active material and support and to injurious sulfation between the active material and support.

What I claim is—

1. The process of making a plate or other element adapted to be formed into a storage-battery electrode, which consists in mixing oxid of lead, sulfate of lead, and zinc, moistening the mixed materials and pressing them together, and dissolving out the resulting sulfate of zinc, substantially as described.

2. The process of making a plate adapted to be formed into a storage-battery electrode which consists in mixing oxid of lead, sulfate of lead, and zinc, moistening the mixed materials and pressing them together, and dissolving out the resulting sulfate of zinc by making the plate an electrode in a sulfate solution, and passing an electric current through the solution, substantially as described.

3. The process of making a plate adapted to be formed into a storage-battery electrode which consists in mixing oxid of lead, sulfate of lead, and zinc, moistening the mixed materials and pressing them together, and dissolving out the resulting sulfate of zinc by passing an electric current through a sulfate solution to the plate forming the cathode, substantially as described.

4. The process of making a plate adapted to be formed into a storage-battery electrode which consists in mixing oxid of lead, sulfate of lead, and zinc, moistening the mixed materials and pressing them together, and dissolving out the sulfate of zinc by passing an electric current through an electrolyte to the plate forming the cathode, substantially as described.

In testimony whereof I have hereunto set my hand in the presence of two subscribing witnesses.

LEONARD PAGET.

Witnesses:
C. J. SAWYER,
T. F. KEHOE.